(12) United States Patent
Cho et al.

(10) Patent No.: US 11,524,581 B2
(45) Date of Patent: Dec. 13, 2022

(54) IMAGE OUTPUT DEVICE FOR VEHICLE DISPLAYING TIMELINE OF EVENTS

(71) Applicant: LG ELECTRONICS INC., Seoul (KR)

(72) Inventors: Jaehoon Cho, Seoul (KR); Doyun Park, Seoul (KR); Dongkyu Lee, Seoul (KR); Heejeong Heo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/299,555

(22) PCT Filed: Jan. 8, 2019

(86) PCT No.: PCT/KR2019/000254
§ 371 (c)(1),
(2) Date: Jun. 3, 2021

(87) PCT Pub. No.: WO2020/145418
PCT Pub. Date: Jul. 16, 2020

(65) Prior Publication Data
US 2022/0016979 A1    Jan. 20, 2022

(51) Int. Cl.
*B60K 35/00* (2006.01)
*G06F 3/14* (2006.01)
*G06T 3/40* (2006.01)

(52) U.S. Cl.
CPC ............. *B60K 35/00* (2013.01); *G06F 3/14* (2013.01); *G06T 3/40* (2013.01); *B60K 2370/152* (2019.05); *B60K 2370/52* (2019.05)

(58) Field of Classification Search
None
See application file for complete search history.

(56) References Cited

U.S. PATENT DOCUMENTS

| | | | |
|---|---|---|---|
| 10,371,537 B1 * | 8/2019 | Wilczynski | G01C 21/3415 |
| 10,914,600 B1 * | 2/2021 | Spielman | G06Q 30/0284 |
| 2005/0216150 A1 | 9/2005 | Binderberger | |
| 2016/0046188 A1 * | 2/2016 | Wild | B60K 35/00 701/36 |

(Continued)

FOREIGN PATENT DOCUMENTS

| | | |
|---|---|---|
| JP | 10-122875 A | 5/1998 |
| JP | 3798962 B2 | 7/2006 |

(Continued)

*Primary Examiner* — Jason A Pringle-Parker
(74) *Attorney, Agent, or Firm* — Birch, Stewart, Kolasch & Birch, LLP

(57) ABSTRACT

The present invention provides an image output device which is mounted on a vehicle and a control method therefor. The image output device comprises a display and a processor which controls the display to output a timeline that displays events occurring while a vehicle is being driven, wherein the display is divided into a first area and a second area on the basis of the timeline, and the processor classifies the events into a first group and a second group according to a predetermined reference and controls the display to display a first graphic object navigating an event included in the first group on the first area, and display a second graphic object navigating an event included in the second group on the second area.

16 Claims, 15 Drawing Sheets

(56) References Cited

U.S. PATENT DOCUMENTS

| | | | |
|---|---|---|---|
| 2016/0162945 A1* | 6/2016 | Turner | G06Q 30/0259 |
| | | | 705/14.57 |
| 2016/0203422 A1* | 7/2016 | Demarchi | G06F 16/29 |
| | | | 705/6 |
| 2016/0311323 A1* | 10/2016 | Lee | B60K 37/06 |
| 2019/0072405 A1* | 3/2019 | Luchner | G01C 21/362 |
| 2019/0096267 A1* | 3/2019 | Shamasundar | G08G 5/0021 |
| 2019/0324600 A1* | 10/2019 | Wipperfurth | G06F 3/0484 |
| 2021/0294485 A1* | 9/2021 | Li | G06F 3/04842 |

FOREIGN PATENT DOCUMENTS

| | | |
|---|---|---|
| JP | 2011-77898 A | 4/2011 |
| JP | 2018-103880 A | 7/2018 |

\* cited by examiner

IMAGE OUTPUT DEVICE FOR VEHICLE DISPLAYING TIMELINE OF EVENTS

CROSS REFERENCE TO RELATED APPLICATIONS

This application is the National Phase of PCT International Application No. PCT/KR2019/000254, filed on Jan. 8, 2019, which is hereby expressly incorporated by reference into the present application.

TECHNICAL FIELD

The present disclosure relates to an image output device that is mounted on a vehicle and is configured to display various types of visual information, and a control method therefor.

BACKGROUND

A vehicle refers to means of transporting people or goods by using kinetic energy. Representative examples of vehicles include automobiles and motorcycles.

For safety and convenience of a user who uses the vehicle, various sensors and devices are provided in the vehicle, and functions of the vehicle are diversified.

The functions of the vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (AEB), and the like.

In order to further improve the convenience functions and the safety functions, a vehicle-specific communication technology is being developed. For example, a vehicle to infrastructure (V2I) that enables communication between a vehicle and an infrastructure, a Vehicle to Vehicle (V2V) that enables communication between vehicles, a Vehicle to Everything (V2X) that enables communication between a vehicle and an object, and the like.

An image output device for visually providing occupants or passengers on board with various information may be disposed at a vehicle. The image output device includes a head-up display (HUD) that presents information through a windshield of a vehicle or a separately provided transparent screen, and/or various displays that output information through a panel.

The image output device is evolving into a way to provide route navigation information to the destination and information regarding a point of interest (POI) while effectively providing various information. In particular, a research has been conducted to provide an image output device that can directly and effectively provide necessary information in a manner that does not interfere with driving of the driver who needs to pay attention while driving.

SUMMARY

The present disclosure is directed to solving the aforementioned problems and other drawbacks.

One aspect of the present disclosure is to provide an image output device that can provide various information to passengers on board, and a control method therefor.

Another aspect of the present disclosure is to provide an image output device that can provide various information in a dynamic manner in consideration of the characteristics of a moving vehicle, and a control method therefor.

The present disclosure relates to an image output device provided or mounted on a vehicle, and a control method therefor.

The image output device may include a display, and a processor configured to control the display to output a timeline for displaying events occurring while the vehicle is traveling. The display may be divided into a first area and a second area with respect to the timeline. The processor may classify the events into a first group and a second group according to a predetermined reference, and control the display such that a first graphic object indicating an event included in the first group is displayed on the first area and a second graphic object indicating an event included in the second group is displayed on the second area.

In some implementations, the processor may control the display such that a position of at least a part of the timeline is changed according to a driving mode of the vehicle.

In some implementations, when the position of the part of the timeline is changed, the processor may control the display such that a size of at least one of the first graphic object and the second graphic object is changed.

In some implementations, the position of the part of the timeline may be changed to enlarge the second area when the vehicle is in an autonomous driving mode, and a size of a graphic object indicating an event included in the second group may be increased as the second area is enlarged.

In some implementations, the position of the part of the timeline may be changed to enlarge the first area when the vehicle is in a manual driving mode, and a size of a graphic object indicating an event included in the first group may be increased as the first area is enlarged.

In some implementations, one end of the timeline may indicate a time point when the vehicle was turned on, and another end of the timeline may indicate a current time point. The processor may control the display such that the timeline extends in one direction as the vehicle travels, and an extent to which the timeline extends may vary according to a driving speed of the vehicle.

In some implementations, the another end of the timeline may move in a different direction perpendicular to the one direction in response to a driving mode of the vehicle when the driving mode of the vehicle is switched.

In some implementations, a communication unit configured to receive a terminal event occurred in a mobile terminal located in the vehicle may be further provided. The processor may control the display such that a graphic object indicating the terminal event is displayed on the first area.

In some implementations, the communication unit may receive an electrical component event from an electrical component provided in the vehicle and generating vehicle driving information. The processor may control the display such that a graphic object indicating the electrical component event is displayed on the second area.

In some implementations, the processor may classify events relevant to driving of the vehicle as the first group, and events irrelevant to the driving of the vehicle as the second group.

A method for controlling an image output device, the method may include: controlling a display to output a timeline for displaying events occurring while a vehicle is traveling, the display being divided into a first area and a second area with respect to the timeline; classifying the events into a first group and a second group according to a predetermined reference; and controlling the display such that a first graphic object indicating an event included in the first group is displayed on the first area, and a second graphic object indicating an event included in the second group is displayed on the second area.

In some implementations, the method may further include controlling the display such that a position of at least a part of the timeline is changed according to a driving mode of the vehicle.

In some implementations, the method may further include controlling the display such that a size of at least one of the first graphic object and the second graphic object is changed when the position of the part of the timeline is changed.

In some implementations, the position of the part of the timeline may be changed to enlarge the second area when the vehicle is in an autonomous driving mode, and a size of a graphic object indicating an event included in the second group may be increased as the second area is enlarged.

In some implementations, the position of the part of the timeline may be changed to enlarge the first area when the vehicle is in a manual driving mode, and a size of a graphic object indicating an event included in the first group may be increased as the first area is enlarged.

In some implementations, the method may further include controlling the display such that the timeline extends in one direction as the vehicle travels, and an extent to which the timeline extends may vary according to a driving speed of the vehicle. One end of the timeline may indicate a time point when the vehicle was turned on, and another end of the timeline may indicate a current time point.

In some implementations, the another end of the timeline may move in a different direction perpendicular to the one direction in response to a driving mode of the vehicle when the driving mode of the vehicle is switched.

In some implementations, the method may include: receiving a terminal event occurred in a mobile terminal located in the vehicle through a communication unit; and controlling the display such that a graphic object indicating the terminal event is displayed on the first area.

In some implementations, the method may include: receiving an electrical component event from an electrical component provided in the vehicle and generating vehicle driving information through the communication unit; and controlling the display such that a graphic object indicating the electrical component event is displayed on the second area.

In some implementations, events relevant to driving of the vehicle may be classified as the first group, and events irrelevant to the driving of the vehicle may be classified as the second group.

An image output device and a control method therefor according to implementations of the present disclosure may provide the following benefits.

The image output device according to the present disclosure may provide passengers on board a next-generation vehicle with information in an optimized manner through a smooth large screen display.

Further, various events occurring while a vehicle is traveling may be effectively presented to passengers on board using a timeline, and a user interface that enables the passengers to intuitively or quickly recognize a driving mode may be provided.

DETAILED DESCRIPTION

Figure 1:
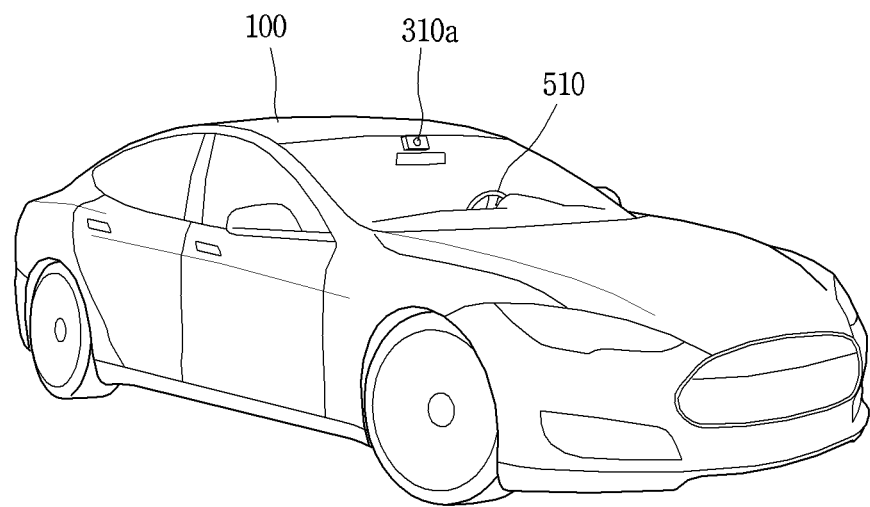
FIG. 1 illustrates an outer appearance of a vehicle according to an implementation of the present disclosure.
Figure 1:
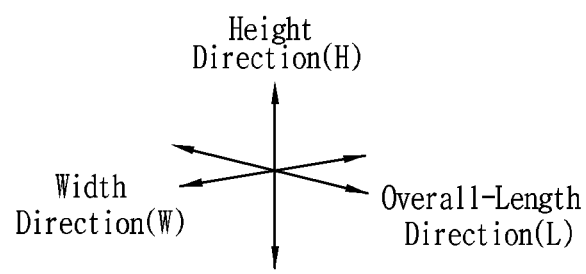

Description will now be given in detail according to one or more implementations disclosed herein, with reference to the accompanying drawings. In the drawings, the same or similar elements are designated with the same or similar reference numerals, and redundant description has been omitted. The suffixes "module" and "unit" for components or elements used in the following description are given or mixed in consideration of ease in creating specification, and do not have distinct meanings or roles. In describing implementations, if a detailed explanation for a related known technology or construction is considered to unnecessarily divert the main point, such explanation has been omitted but would be understood by those skilled in the art. Also, it should be understood that the accompanying drawings are merely illustrated to easily explain the concept, and therefore, they should not be construed to limit the technological concept disclosed herein by the accompanying drawings, and the concept should be construed as being extended to all modifications, equivalents, and substitutes included in the concept and technological scope.

Terms including ordinal numbers such as first and second may be used to describe various elements, but the elements are not limited by the terms. The terms are used merely for the purpose to distinguish an element from another element.

It will be understood that when an element is referred to as being "connected with" another element, the element can be directly connected with the other element or intervening elements may also be present. On the contrary, in case where an element is "directly connected" or "directly linked" to another element, it should be understood that any other element is not existed therebetween.

Singular expressions include plural expressions unless the context clearly indicates otherwise.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, elements, components or combinations thereof are not excluded in advance.

A vehicle disclosed herein may include various types of automobiles such as cars, motorcycles, and the like. Hereinafter, the vehicle will be described based on a car.

The vehicle disclosed herein may include any of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving or traveling direction of the vehicle, and a right side of the vehicle refers to a right side in the driving direction.

FIG. 1 illustrates an outer appearance of a vehicle according to an implementation of the present disclosure.

Figure 2:
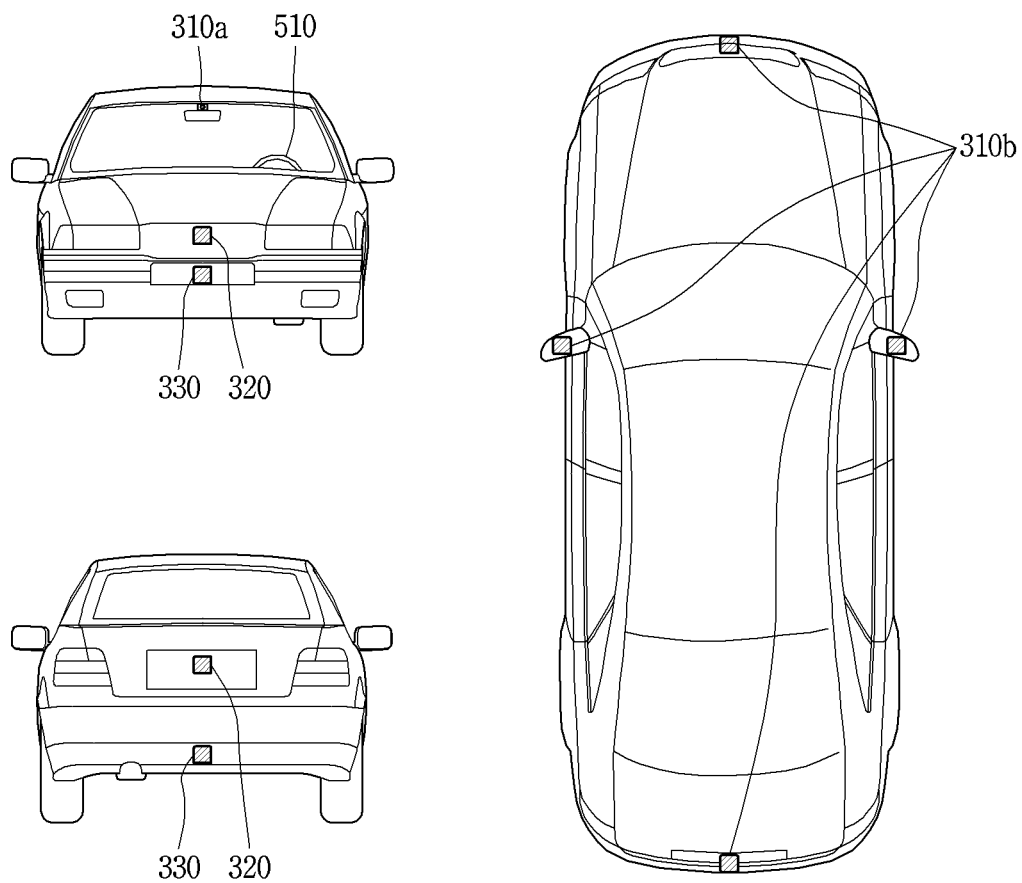
FIG. 2 illustrates a vehicle exterior from various angles according to an implementation of the present disclosure.

FIG. 2 illustrates a vehicle exterior from various angles according to an implementation of the present disclosure.

Figure 3:
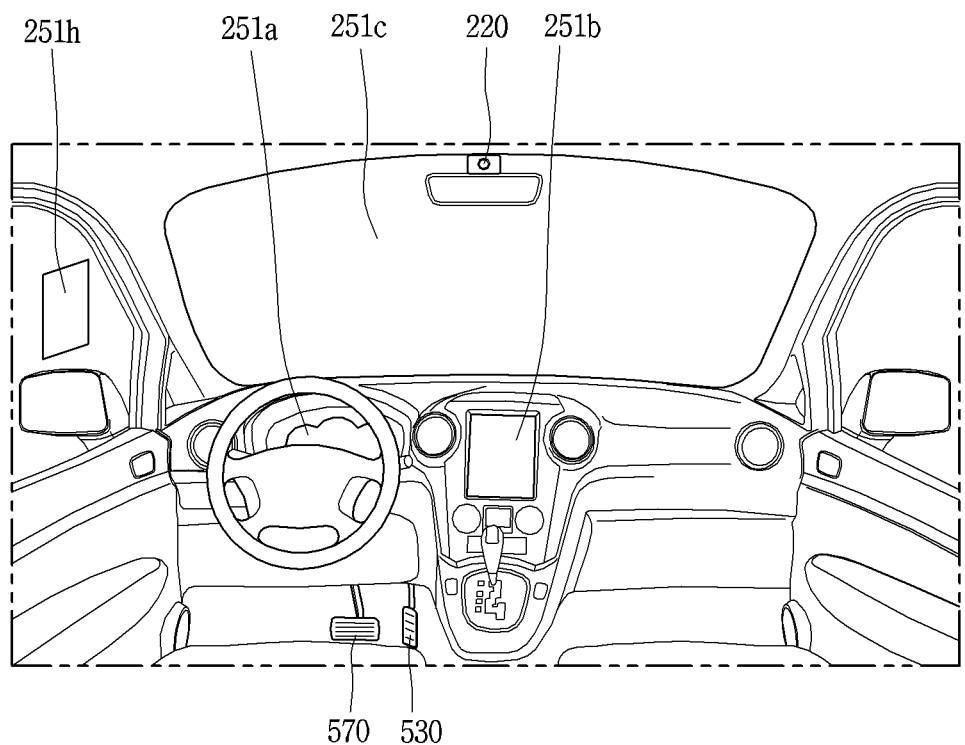
FIGS. 3 and 4 are views illustrating a vehicle interior according to an implementation of the present disclosure.
Figure 4:
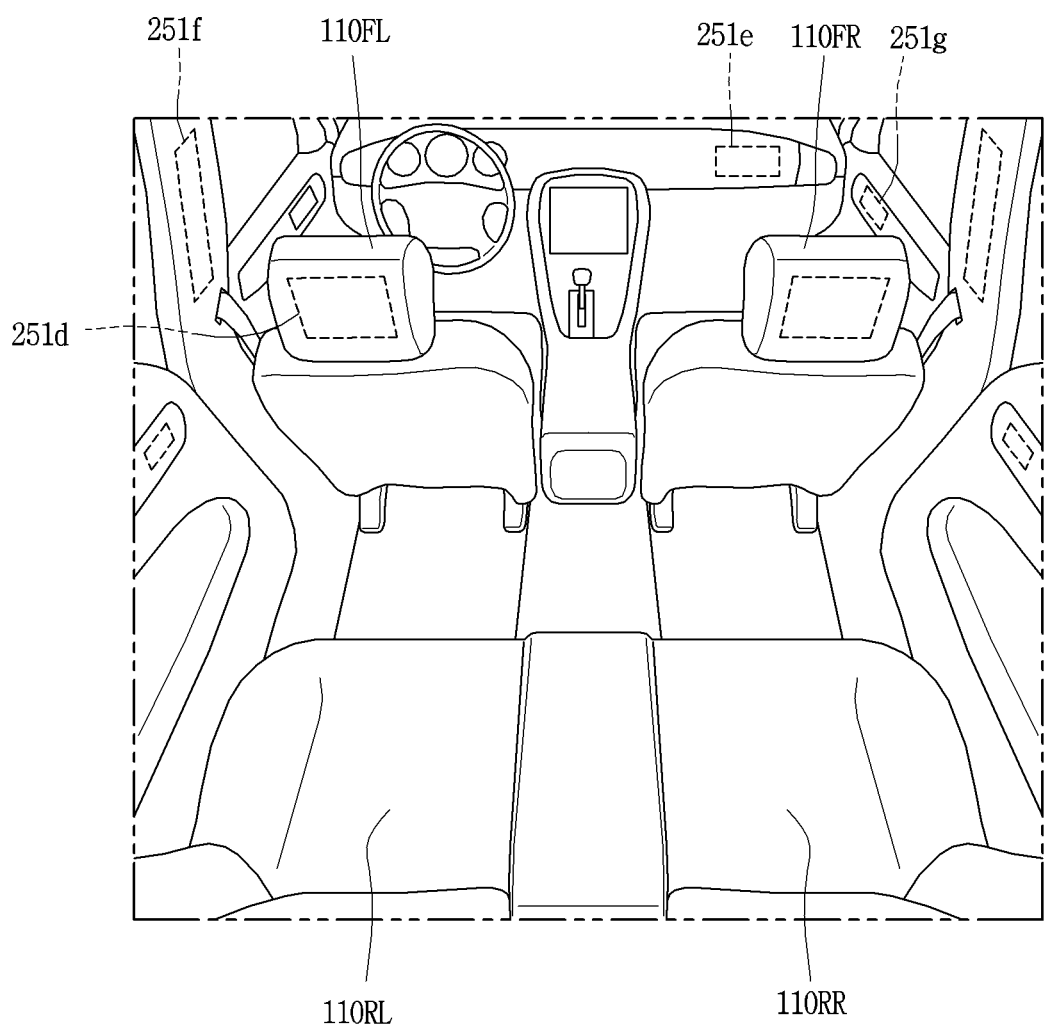

FIGS. 3 and 4 are views illustrating a vehicle interior according to an implementation of the present disclosure.

Figure 5:
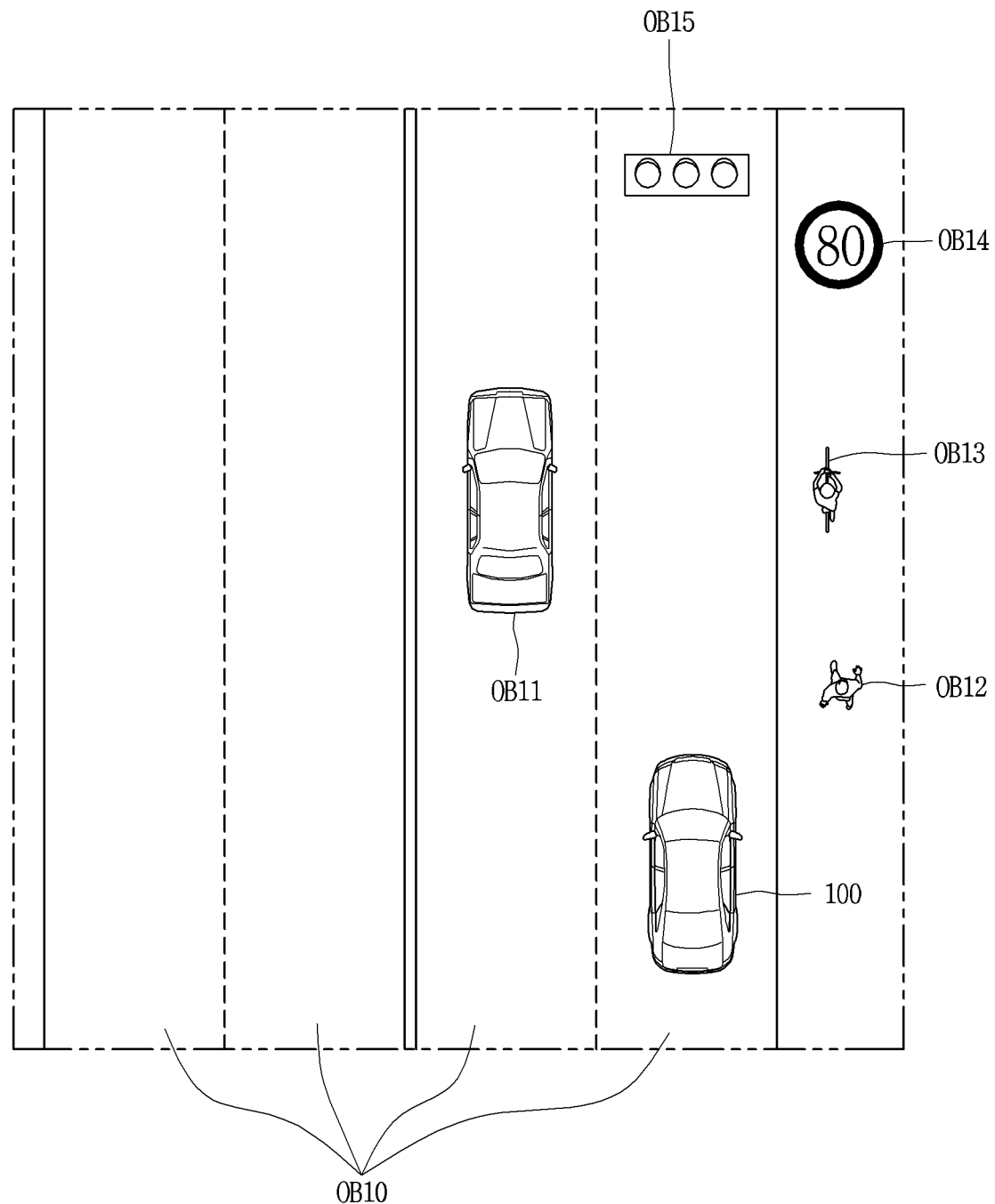
FIGS. 5 and 6 are views referenced to describe objects according to an implementation of the present disclosure.
Figure 6:
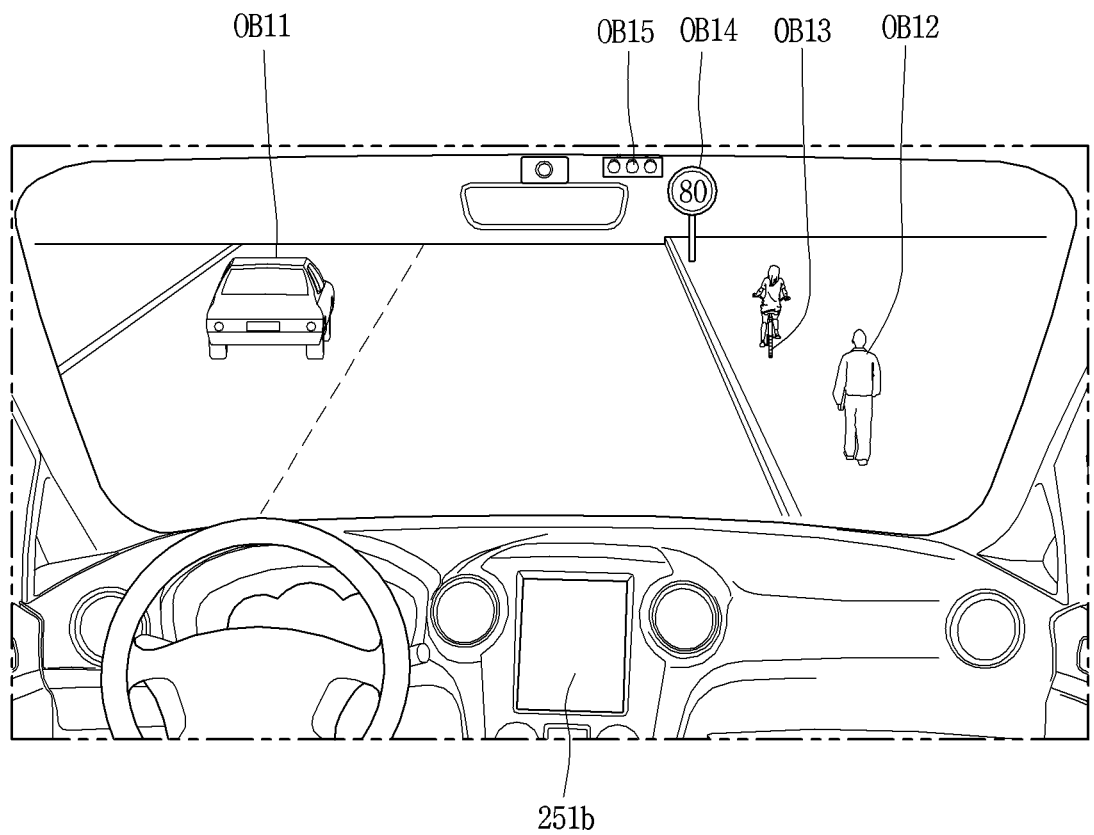

FIGS. 5 and 6 are views referenced to describe objects according to an implementation of the present disclosure.

Figure 7:
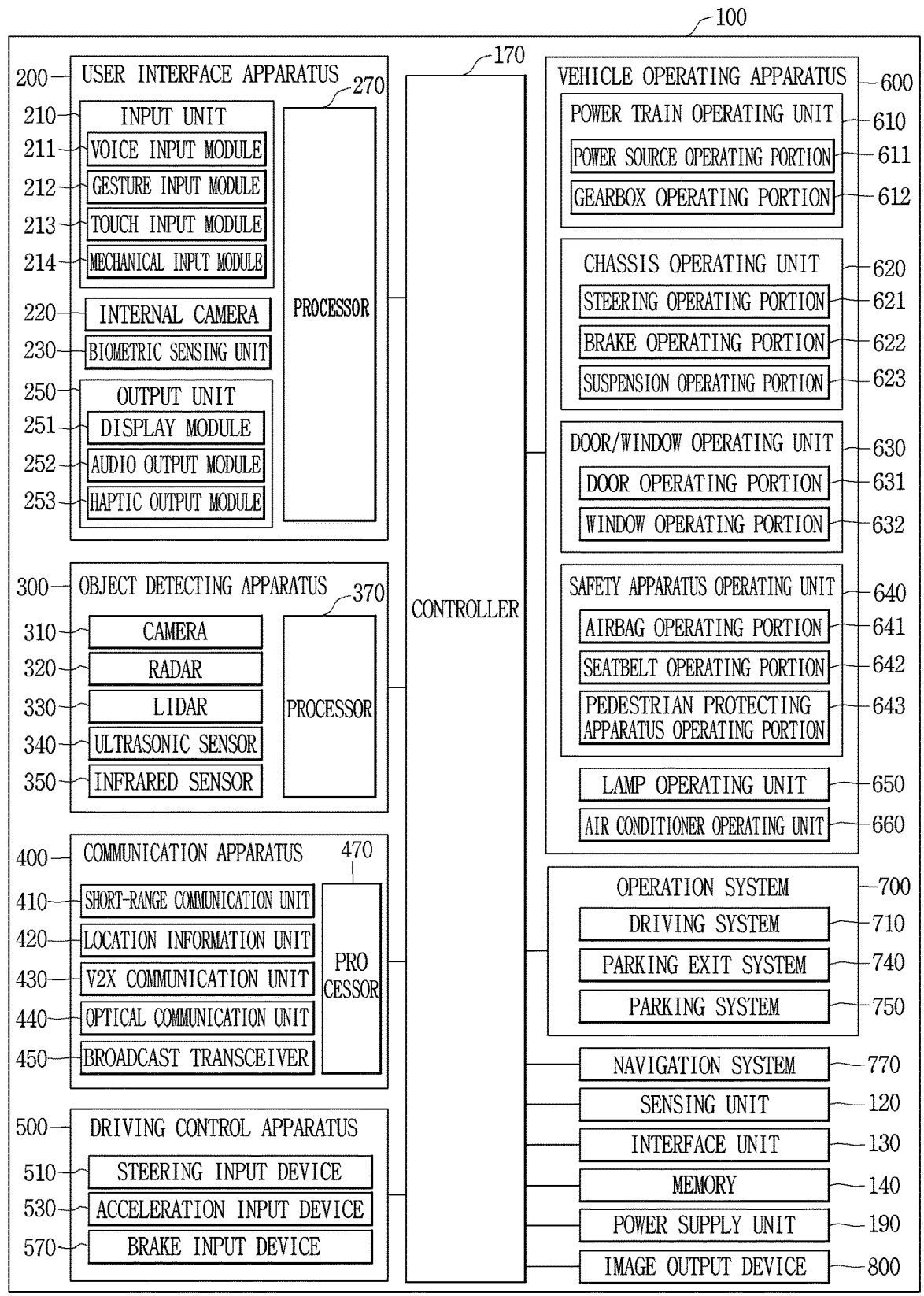
FIG. 7 is a block diagram referenced to describe a vehicle according to an implementation of the present disclosure.

FIG. 7 is a block diagram referenced to describe a vehicle according to an implementation of the present disclosure.

As illustrated in FIGS. 1 to 7, a vehicle 100 may include wheels turning by a driving force, and a steering input device 510 for adjusting a driving (proceeding, moving) direction of the vehicle 100.

The vehicle 100 may be an autonomous vehicle.

Here, the autonomous driving is defined as controlling at least one of acceleration, deceleration, and a driving direction based on a preset algorithm. In other words, the autonomous driving refers to that a driving control apparatus is automatically manipulated even without a user input to the driving control apparatus.

The vehicle 100 may be switched into an autonomous mode or a manual mode based on a user input.

For example, the vehicle 100 may be switched from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous mode into the manual mode based on driving environment information generated in the object detecting apparatus 300.

For example, the vehicle 100 may be switched from the manual mode into the autonomous mode or from the autonomous mode into the manual mode based on driving environment information received through a communication apparatus 400.

The vehicle 100 may be switched from the manual mode into the autonomous mode or from the autonomous mode into the manual mode based on information, data, or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740, and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction that is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170, and a power supply unit 190.

According to some implementations, the vehicle 100 may include more components in addition to the components described in this specification or may exclude one or more of the components described herein.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250, and a processor 270.

According to some implementations, the user interface apparatus 200 may include more components in addition to the components described herein or may not include some of those components described herein.

The input unit 210 may allow the user to input information. Data collected in the input unit 210 may be analyzed by the processor 270 and processed as a user's control command.

The input unit 210 may be disposed inside the vehicle. For example, the input unit 210 may be disposed on one area of a steering wheel, one area of an instrument panel, one area of a seat, one area of each pillar, one area of a door, one area of a center console, one area of a headlining, one area of a sun visor, one area of a windshield, one area of a window, or other suitable areas in the vehicle.

The input unit 210 may include an audio (or voice) input module 211, a gesture input module 212, a touch input module 213, and a mechanical input module 214.

The audio input module 211 may convert a user's voice input into an electric signal. The converted electric signal may be provided to the processor 270 or the controller 170.

The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

In some implementations, the gesture input module 212 may detect a user's three-dimensional (3D) gesture input. To this end, the gesture input module 212 may include a light-emitting diode outputting a plurality of infrared rays or a plurality of image sensors.

The gesture input module 212 may detect the user's 3D gesture input by a time of flight (TOF) method, a structured light method, or a disparity method.

The touch input module 213 may convert the user's touch input into an electric signal. The converted electric signal may be provided to the processor 270 or the controller 170.

The touch input module 213 may include a touch sensor for detecting the user's touch input.

In some implementations, the touch input module 213 may be integrated with a display module 251 so as to implement a touch screen. The touch screen may provide an input interface and an output interface between the vehicle 100 and the user.

The mechanical input module 214 may include at least one of a button, a dome switch, a jog wheel, and a jog switch. An electric signal generated by the mechanical input module 214 may be provided to the processor 270 or the controller 170.

The mechanical input module 214 may be disposed on a steering wheel, a center fascia, a center console, a cockpit module, a door, and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible, or tactile signal.

The output unit 250 may include at least one of a display module 251, an audio output module 252, and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display, and an e-ink display.

The display module 251 may be inter-layered or integrated with a touch input module 213 to implement a touch screen.

The display module 251 may be implemented as a head-up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

In some implementations, the user interface apparatus 200 may include a plurality of display modules 251*a* to 251*g*.

The display module 251 may be disposed on one area of a steering wheel, one area 251*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 may convert an electric signal provided from the processor 270 or the controller 170 into an audio signal for output. To this end, the audio output module 252 may include at least one speaker.

The haptic output module 253 may generate a tactile output. For example, the haptic output module 253 may vibrate the steering wheel, a safety belt, a seat 110FL, 110FR, 110RL, 110RR, allowing the user to recognize such output.

The processor 270 may control an overall operation of each unit of the user interface apparatus 200.

According to some implementations, the user interface apparatus 200 may include a plurality of processors 270 or may not include the processor 270.

When the processor 270 is not included in the user interface apparatus 200, the user interface apparatus 200 may operate according to a control of a processor of another apparatus within the vehicle 100 or the controller 170.

The user interface apparatus 200 may also be referred to herein as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving or operation of the vehicle 100.

Referring to FIGS. 5 and 6, an object O may include traffic lanes OB10, another vehicle OB11, a pedestrian OB12, a two-wheeled vehicle OB13, traffic signals OB14 and OB15, light, a road, a structure, a speed hump, a terrain, an animal, and the like.

The lane OB10 may be a driving lane, a lane next to the driving lane, or a lane on which another vehicle comes in an opposite direction to the vehicle 100. Each lane OB10 may include left and right lines forming the lane.

The another vehicle OB11 may be a vehicle which is moving near the vehicle 100. The another vehicle OB11 may be a vehicle located within a predetermined distance from the vehicle 100. For example, the another vehicle OB11 may be a vehicle moving ahead of or behind the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14, and a pattern or text drawn on a road surface.

The light may be light emitted from a lamp provided on another vehicle. The light may be light generated from a streetlamp. The light may be solar light.

The road may include a road surface, a curve, an upward slope, a downward slope, and the like.

The structure may be an object that is located near a road and fixed on the ground. For example, the structure may include a streetlamp, a roadside tree, a building, an electric pole, a traffic light, a bridge, and the like.

The terrain may include a mountain, a hill, and the like.

Meanwhile, objects may be classified into a moving object and a fixed object. For example, the moving object may include another vehicle and a pedestrian. The fixed object may include, for example, a traffic signal, a road, or a structure.

The object detecting apparatus 300 may include a camera 310, a radar 320, a LiDAR 330, an ultrasonic sensor 340, an infrared sensor 350, and a processor 370.

According to some implementations, the object detecting apparatus 300 may further include other components in addition to the components described herein, or may exclude one or more of the components described herein.

The camera 310 may be located on an appropriate portion outside the vehicle to acquire an external image of the vehicle. The camera 310 may be a mono camera, a stereo camera 310a, an around view monitoring (AVM) camera 310b, or a 360-degree camera.

In some implementations, the camera 310 may be disposed adjacent to a front windshield within the vehicle to acquire a front image of the vehicle. Alternatively, the camera 310 may be disposed adjacent to a front bumper or a radiator grill.

Alternatively, the camera 310 may be disposed adjacent to a rear glass within the vehicle to acquire a rear image of the vehicle. Alternatively, the camera 310 may be disposed adjacent to a rear bumper, a trunk or a tail gate.

Alternatively, the camera 310 may be disposed adjacent to at least one of side windows within the vehicle to acquire a side image of the vehicle. Alternatively, the camera 310 may be disposed adjacent to a side mirror, a fender, or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keying (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear, or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect an object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear, or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 350 may detect an object based on infrared light, and detect a position of the detected object, a distance from the detected object and a relative speed with the detected object.

The infrared sensor 350 may be disposed on an appropriate position outside the vehicle for detecting an object located at the front, rear, or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave, which is generated when an emitted electromagnetic wave is reflected from the object, and track the object. The processor 370 may execute operations, such as a calculation of a distance from the object, a calculation of a relative speed with the object and the like, based on the reflected electromagnetic wave.

The processor 370 may detect an object based on a reflected laser beam, which is generated when an emitted laser beam is reflected from the object, and track the object. The processor 370 may execute operations, such as a calculation of a distance from the object, a calculation of a relative speed with the object and the like, based on the reflected laser beam.

The processor 370 may detect an object based on a reflected ultrasonic wave, which is generated when an emitted ultrasonic wave is reflected from the object, and track the object. The processor 370 may execute operations, such as a calculation of a distance from the object, a calculation of a relative speed with the object and the like, based on the reflected ultrasonic wave.

The processor may detect an object based on reflected infrared light, which is generated when emitted infrared light is reflected from the object, and track the object. The processor 370 may execute operations, such as a calculation of a distance from the object, a calculation of a relative speed with the object and the like, based on the reflected infrared light.

In some implementations, the object detecting apparatus 300 may include a plurality of processors 370 or may not include the processor 370. For example, each of the camera 310, the radar 320, the LiDAR 330, the ultrasonic sensor 340 and the infrared sensor 350 may include a processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server. The communication device 400 may be referred to as a 'wireless communication unit'.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450, and a processor 470.

According to some implementations, the communication apparatus 400 may further include other components in addition to the components described herein, or may not include some of the components described herein.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V), and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

In some implementations, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication apparatus 400.

According to some implementations, the communication apparatus 400 may include a plurality of processors 470 or may not include the processor 470.

When the processor 470 is not included in the communication apparatus 400, the communication apparatus 400 may operate according to the control of a processor of another device within the vehicle 100 or the controller 170.

In some implementations, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530, and a brake input device 570.

The steering input device 510 may receive an input regarding a driving (proceeding) direction of the vehicle 100 from the user. In some examples, the steering input device 510 may be configured in the form of a wheel allowing a steering input in a rotating manner. In some implementations, the steering input device 510 may be configured as a touch screen, a touch pad, or a button.

The acceleration input device 530 may receive an input for accelerating the vehicle 100 from the user. The brake input device 570 may receive an input for braking the vehicle 100 from the user. In some examples, each of the acceleration input device 530 and the brake input device 570 may be configured in the form of a pedal. In some implementations, the acceleration input device 530 or the brake input device 570 may be configured as a touch screen, a touch pad, or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some implementations, the vehicle operating apparatus 600 may further include other components in addition to the components described herein, or may not include some of the components described herein.

In some implementations, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N), or parking (P).

When an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622, and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In some implementations, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In some implementations, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642, and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, and 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740, and a parking system 750.

According to some implementations, the operation system 700 may further include other components in addition to components described herein, or may not include some of the components described herein.

In some implementations, the operation system 700 may include a processor. Each unit of the operation system 700 may individually include at least one processor.

In some implementations, the operation system may be implemented by the controller 170 when it is implemented in a software configuration.

In some implementations, the operation system 700 may be implemented by at least one of the user interface apparatus 200, the object detecting apparatus 300, the communication apparatus 400, the vehicle operating apparatus 600, and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600, and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600, and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information, and current location information of the vehicle.

The navigation system 770 may include a memory and a processor. The memory may store the navigation information. The processor may control an operation of the navigation system 770.

In some implementations, the navigation system 770 may update prestored information by receiving information from an external device through the communication apparatus 400.

In some implementations, the navigation system 770 may be classified as a sub component of the user interface apparatus 200.

The sensing unit 120 may detect a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal, and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some implementations, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive, and the like in a hardware configuration. The memory 140 may store various data for overall operations of the vehicle 100, such as programs for processing or controlling the controller 170.

In some implementations, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

Hereinafter, an image output device 800 provided in the vehicle 100 will be described in detail.

The image output device 800 that is provided in the vehicle 100 may be implemented as an independent device detachable from the vehicle 100, or as a part of the vehicle 100 integrally installed in the vehicle 100.

All the operation and control method of the image output device 800 described herein may be alternatively performed by the controller 170 of the vehicle 100. That is, the operation and/or control method performed by a processor 870 of the image output device 800 may be performed by the controller 170 of the vehicle 800.

Figure 8:
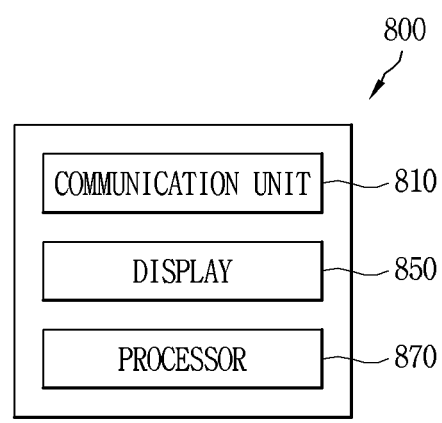
FIG. 8 is a schematic view illustrating an image output device according to an implementation of the present disclosure.

Referring to FIG. 8, the image output device 800 includes a communication unit 810, a display 850, and a processor 870.

The communication unit 810 is configured to perform communication with the various components described in FIG. 7. For example, the communication unit 810 may receive various information provided through a controller area network (CAN). In another example, the communication unit 810 may communicate with all devices capable of performing communication, such as a vehicle, a mobile terminal, a server, and another vehicle. This may be referred to as Vehicle to everything (V2X) communication. The V2X communication may be defined as a technology of exchanging or sharing information, such as traffic condition and the like, while communicating with a road infrastructure and other vehicles during driving.

The communication unit 810 may be configured to perform communication with one or more devices disposed at the vehicle 100.

Further, the communication unit 810 may receive information related to the driving of the vehicle from most of the devices provided in the vehicle 100. The information transmitted from the vehicle 100 to the image output device 800 is referred to as 'vehicle driving information (or vehicle travel information)'.

Vehicle driving information includes vehicle information and surrounding information related to the vehicle. Information related to the inside of the vehicle with respect to the frame of the vehicle 100 may be defined as the vehicle information, and information related to the outside of the vehicle may be defined as the surrounding information.

The vehicle information refers to information related to the vehicle itself. For example, the vehicle information may include a driving speed, a driving direction, an acceleration, an angular velocity, a location (GPS), a weight, a number of passengers in the vehicle, a braking force of the vehicle, a maximum braking force, air pressure of each wheel, a centrifugal force applied to the vehicle, a driving mode of the vehicle (autonomous driving mode or manual driving mode), a parking mode of the vehicle (autonomous parting mode, automatic parking mode, manual parking mode), whether or not a user is on board the vehicle, and information associated with the user.

The surrounding information refers to information related to another object located within a predetermined range around the vehicle, and information related to the outside of the vehicle. The surrounding information of the vehicle may be a state of a road surface on which the vehicle is traveling (e.g., a frictional force), the weather, a distance from a front-side (rear-side) vehicle, a relative speed of a front-side (rear-side) vehicle, a curvature of a curve when a driving lane is the curve, information associated with an object existing in a reference region (predetermined region) based on the vehicle, whether or not an object enters (or leaves) the predetermined region, whether or not the user exists near the vehicle, information associated with the user (e.g., whether or not the user is an authenticated user), and the like.

The surrounding information may also include ambient brightness, a temperature, a position of the sun, information related to a nearby object (a person, another vehicle, a sign, etc.), a type of a driving road surface, a landmark, line information, and driving lane information, and information required for an autonomous travel/autonomous parking/automatic parking/manual parking mode.

In addition, the surrounding information may further include a distance from an object existing around the vehicle to the vehicle 100, collision possibility, a type of an object, a parking space for the vehicle, an object for identifying the parking space (e.g., a parking line, a string, another vehicle, a wall, etc.), and the like.

The vehicle driving information is not limited to the examples described above and may include all information generated from the components provided in the vehicle 100.

The display 850 is configured to output various visual information according to the control of the processor 870.

The display 850 may output visual information to a windshield of a vehicle or a separately provided screen, or may output visual information through a panel. The display 850 may correspond to the display module 251 described with reference to FIGS. 1 to 7.

For example, visual information output by the display 850 is reflected from the windshield or the screen, giving an impression or effect that the visual information is being displayed on the windshield or the screen. This may allow an occupant or passenger on board to simultaneously check the real world at the outside of the vehicle 100 and a virtual object displayed on the windshield or the screen. Augmented reality can be achieved through the display 850.

The processor 870 is configured to perform various operations to be described hereinafter and to control the communication unit 810 and the display 850.

The processor 870 may be configured to control one or more devices provided in the vehicle 100 using the communication unit 810.

More specifically, the processor 870 may determine whether or not at least one of a plurality of preset or predetermined conditions is satisfied, based on vehicle driving information received through the communication unit 810. According to a satisfied condition, the processor 870 may control the one or more displays in different ways.

In association with the preset conditions, the processor 870 may detect an occurrence of an event in an electric component provided in the vehicle 100 and/or application, and determine whether the detected event meets a preset condition. Here, the processor 870 may detect the occurrence of the event from information received through the communication unit 810.

The application may be implemented, for example, as a widget, a home launcher, and the like, and refer to various types of programs that can be executed on the vehicle 100. Accordingly, the application may be a program that performs a function of a web browser, a video playback, a message transmission/reception, a schedule management, or an application update.

Further, the application may include a forward collision warning (FCW), a blind spot detection (BSD), a lane departure warning (LDW), a pedestrian detection (PD), a curve speed warning (CSW), and a turn-by-turn navigation (TBT).

For example, the occurrence of the event may be a missed call, presence of an application to be updated, a message arrival, start on, start off, autonomous travel on/off, pressing of an LCD awake key, an alarm, an incoming call, a missed notification, and the like.

As another example, the occurrence of the event may be a generation of an alert set in the advanced driver assistance system (ADAS), or an execution of a function set in the ADAS. For example, the occurrence of the event may be an occurrence of forward collision warning, an occurrence of a blind spot detection, an occurrence of lane departure warning, an occurrence of lane keeping assist warning, or an execution of autonomous emergency braking.

As another example, the occurrence of the event may also be a change from a forward gear to a reverse gear, an occurrence of an acceleration greater than a predetermined value, an occurrence of a deceleration greater than a predetermined value, a change of a power device from an internal combustion engine to a motor, or a change from the motor to the internal combustion engine.

In addition, even when various ECUs provided in the vehicle 100 perform specific functions, it may be determined as the occurrence of the event.

For example, when a generated event satisfies the preset condition, the processor 870 may control the communication unit 810 to display information corresponding to the satisfied condition on one or more displays provided in the vehicle.

The processor 870 may transmit an autonomous driving message to at least one of a plurality of devices provided in the vehicle 100 to enable autonomous driving of the vehicle 100. For example, an autonomous driving message may be transferred to a brake for decelerating the vehicle 100, or to a steering device for changing a driving direction.

Figure 9A:
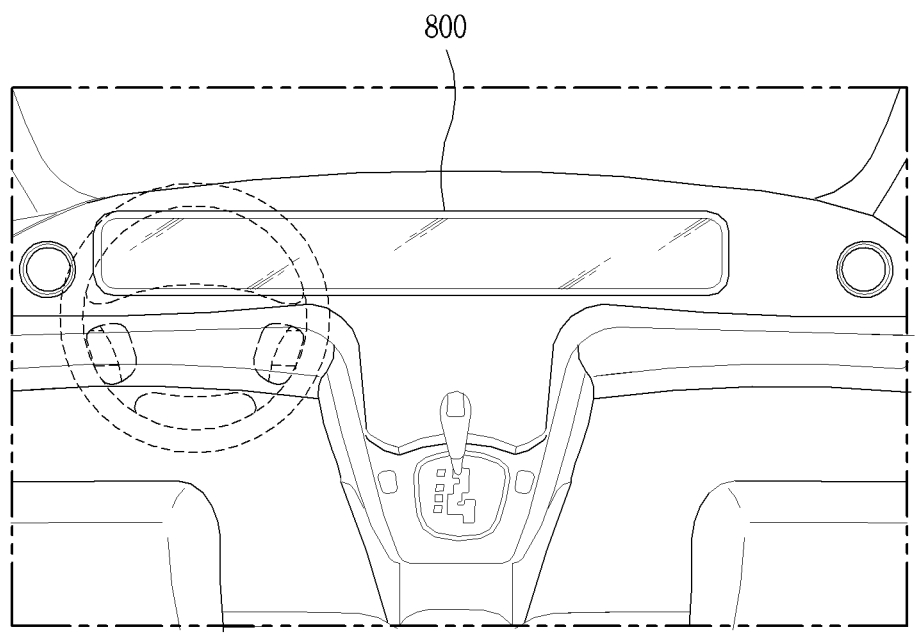
FIGS. 9A and 9B are views illustrating an example of an image output device of the present disclosure.
Figure 9B:
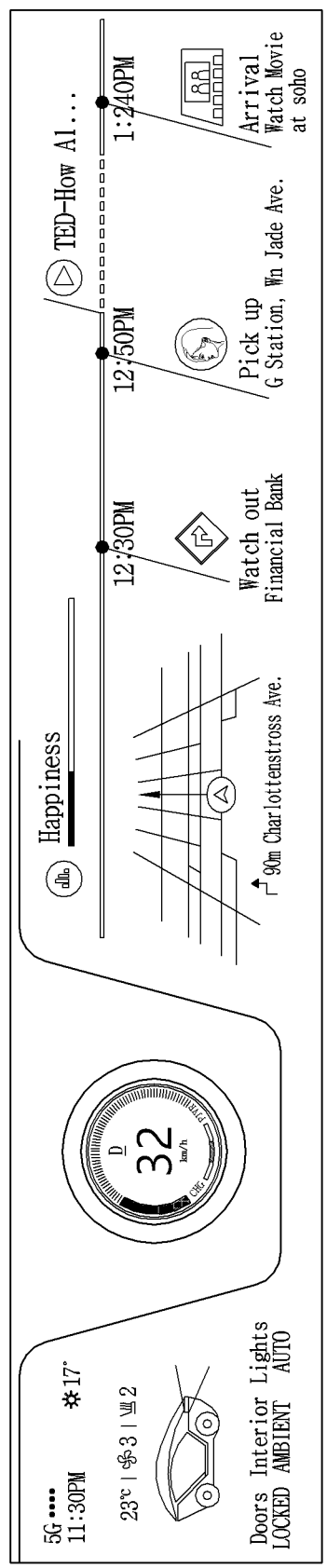

FIGS. 9A and 9B are views illustrating an example of an image output device according to the present disclosure.

The image output device 800 according to the present disclosure may be a large screen located in front of the driver's seat and on the center fascia. Through the image output device 800, the driver may execute a control function related to driving, and a passenger may check various events occurring while the vehicle is traveling.

The display 850 may include an agent area (or region) that displays various information generated by an artificial intelligence (AI) agent capable of having a conversation with the driver, and a timeline area that displays event information related to events occurring during driving.

Figure 10:
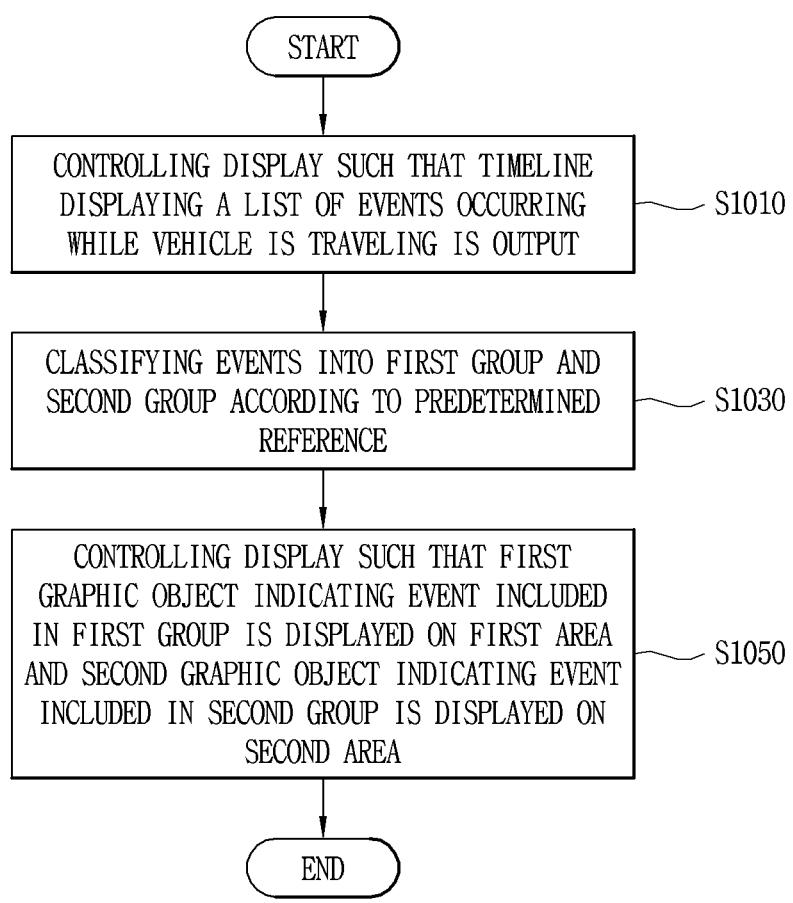
FIG. 10 is a flowchart illustrating an exemplary method for controlling the image output device of FIG. 8.
Figure 11A:
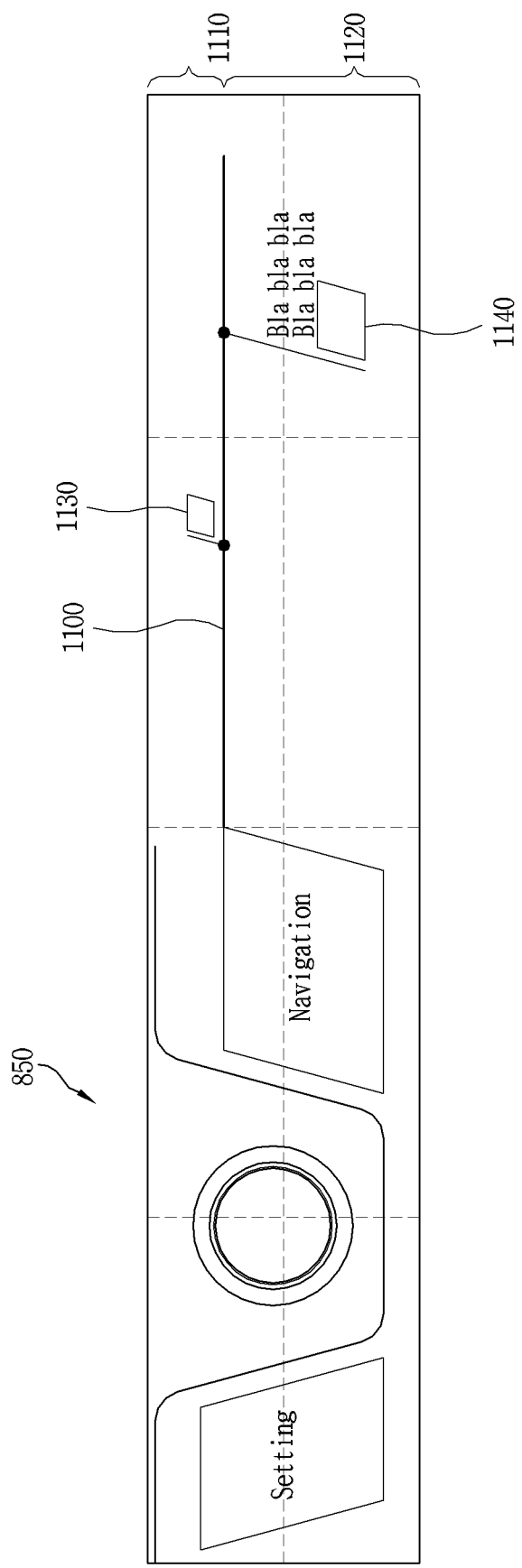
FIGS. 11A and 11B are schematic views illustrating the control method of FIG. 10.
Figure 11B:
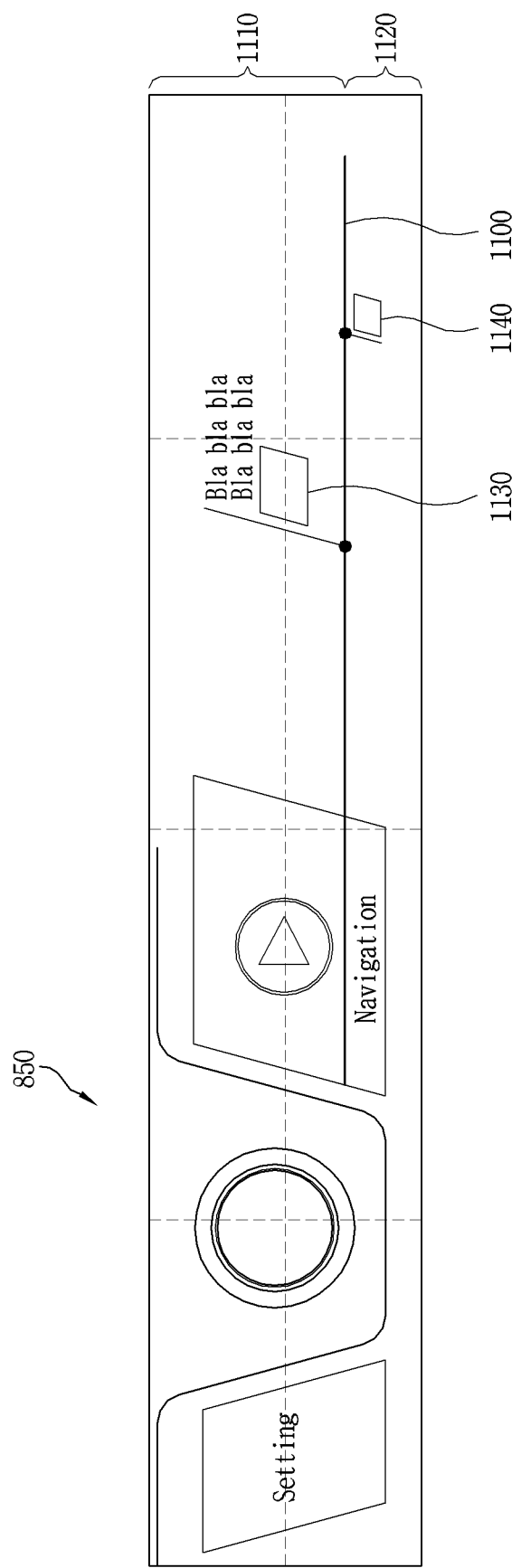

FIG. 10 is a flowchart illustrating an exemplary method for controlling the image output device of FIG. 8, and FIGS. 11A and 11B are schematic views illustrating the control method of FIG. 10.

The processor 870 may control the display 850 such that a timeline displaying a list of events occurring while a vehicle is traveling is output (S1010).

The processor 870 may output a timeline 1100 that is connected from one point to another point of the display 850. For example, the timeline 1100 may be a line extending long in a width direction of the display 850.

The timeline 1100 is used as a reference axis for indicating a specific period of time or time range and a lapse of time. One end of the timeline 1100 may be a start point of the specific time range, and another end of the timeline 1100 may be an end point of the specific time range. The one end may be a left end of the timeline 1100, and the another end may be a right end of the timeline 1100.

The display 850 may be divided into a first area 1110 and a second area 1120 by the timeline 1100. In detail, the timeline 1100 is a line that extends long from a left end to a right end of the display 850, so that the first area 1110 located in an upper position of the time line 1100 and the second area 1120 located in a lower position of the timeline 1100 may be divided by the timeline 1100.

The processor 870 may classify the events into a first group and a second group according to a predetermined reference (S1030).

For example, the processor 870 may classify events according to a device. An event occurred in a device provided in the vehicle may be classified as a "first group", and an event occurred in a device that is not provided in the vehicle may be classified as a "second group".

The communication unit 810 may receive an 'electrical component event' from an electrical component that is provided in the vehicle and generates vehicle driving information. The electrical component event may be classified as the first group.

In addition, the communication unit 810 may receive a 'terminal event' occurred in a mobile terminal located in the vehicle. The terminal event may be classified as the second group.

In some implementations, the processor 870 may determine whether an event is related to driving of the vehicle 100, and classify the event as a first group if it is related to the driving of the vehicle 100 or as a second group if it is not related to the driving of the vehicle 100. The processor 870 may classify events relevant to the driving of the vehicle 100 as the first group, and events irrelevant to the driving of the vehicle 100 as the second group.

For example, when a new passenger opens a door of the vehicle 100 to be seated, this may be considered as an event related to driving as the vehicle 100 comes to a stop and restarts. The event of the new passenger on board the vehicle 100 may be classified as the first group. Events relevant to the driving of the vehicle 100, such as a change of destination and the occurrence of collision, are classified as the first group.

Events irrelevant to the driving of the vehicle 100, such as an incoming text message to the vehicle and a notification for a new video, may be classified as the second group.

In addition, events may be classified into a first group and a second group according to other various references.

The processor 870 controls the display 850 such that a first graphic object 1130 indicating an event included in the first group is displayed on the first area 1110, and a second graphic object 1140 indicating an event included in the second group is displayed on the second area 1120 (S1050).

First group event information indicating an event included in the first group may be displayed on the first area 1110, and second group event information indicating an event included in the second group may be displayed on the second area 1120.

The timeline may allow a passenger on board to visually check a displayed location of a graphic object on the timeline and to intuitively recognize the type of an event.

In some implementations, the processor 870 may control the display 850 such that a position of at least a part or portion of the timeline 1100 is changed according to a driving mode of the vehicle 100.

For example, the driving mode may include an autonomous driving mode and a manual driving mode. The autonomous driving mode may be defined that at least one of a driving direction, acceleration, and deceleration is changed by an algorithm created by an application without a driver's intervention. The manual driving mode may be defined that it is not the autonomous driving mode. Since functions related to autonomous driving may vary according to each vehicle, the autonomous driving mode and the manual driving mode may be variously redefined according to each vehicle. That is, the driving mode may vary according to implementations.

In the autonomous driving mode, there is no need for the driver to look at vehicle driving information carefully. Accordingly, as illustrated in FIG. 11A, in the autonomous driving mode, the timeline 1100 may be displayed closer to an upper end of the display 850 so that the second area 1120 is greater (larger) than the first area 1110.

In the manual driving mode, the driver should pay more attention to events relevant to driving of the vehicle than events irrelevant to the driving of the vehicle. Accordingly, as depicted in FIG. 11B, in the manual driving mode, the timeline 1100 may be displayed closer to a lower end of the display 850 so that the first area 1110 is greater than the second area 1120.

For example, as illustrated in FIGS. 11A and 11B, the timeline 1100 may move up or down according to the driving mode of the vehicle 100. A size of the first area 1110 and a size of the second area 1120 are changed simultaneously in response to movement of the timeline 1100.

When a position of at least a part of the timeline 1100 is changed, the processor 870 controls the display 850 such that a size of at least one of the first graphic object 1130 and the second graphic object 1140 is changed.

As illustrated in FIG. 11A, when the vehicle 100 is in the autonomous driving mode, the position of at least a part of the timeline 1100 is changed such that the second area 1120 is enlarged. As the second area 1120 is enlarged, the size of the second graphic object 1140 indicating an event included in the second group is increased.

As illustrated in FIG. 11B, when the vehicle 100 is in the manual driving mode, the position of at least a part of the timeline 1100 is changed such that the first area 1110 is enlarged. As the first area 1110 is enlarged, the size of the first graphic object 1130 indicating an event included in the first group is increased.

As the size of the graphic object is changed, the amount of information included in the graphic object also changes. For example, the number of texts included in a graphic object may be changed, a new image may be added, or an existing image may be deleted.

The processor 870 may control the display 850 such that the position of at least a part of the timeline 1100 is changed according to speed of the vehicle 100.

For example, when the speed of the vehicle 100 is within a first range, the processor 870 may control the display 850 such that the timeline 1100 is located at a first height with respect to the lower end of the display 850. When the speed of the vehicle 100 is within a second range, the processor 870 may control the display 850 such that the timeline 1100 is located at a second height with respect to the lower end of the display 850.

The display 850 is controlled such that the timeline 1100 moves higher as the speed increases, preventing the driver from checking an event irrelevant to the driving of the vehicle 100.

A graphic object indicating an event is displayed on the first area 1110 or the second area 1120. Events occurred earlier are displayed closer to the left end of the timeline 1100 and events occurred relatively recently are displayed closer to the right end of the timeline 1100, namely, arranged in chronological order, so that the time points (or time) of events can be intuitively recognized. For example, as illustrated in FIG. 11A, the first graphic object 1130 is located closer to the left side than the second graphic object 1140, which means that a first event corresponding to the first graphic object 1110 has occurred prior to a second event corresponding to the second graphic object 1140.

FIGS. 12A, 12B, 12C, and 12D are schematic views illustrating an example of extension of a timeline.

When a destination is set for the vehicle 100, a timeline 1200 may be displayed on the display 850 in a gradually expanding manner as the vehicle 100 travels.

Here, one end 1210 of the timeline 1200 may indicate a time point when the vehicle 100 was turned on, and another end 1220 of the timeline 1200 may indicate a current time point. In addition, an end time point indicating object 1230 indicating an end time point of the destination of the vehicle 100 may be additionally displayed on the display 850.

Figure 12A:
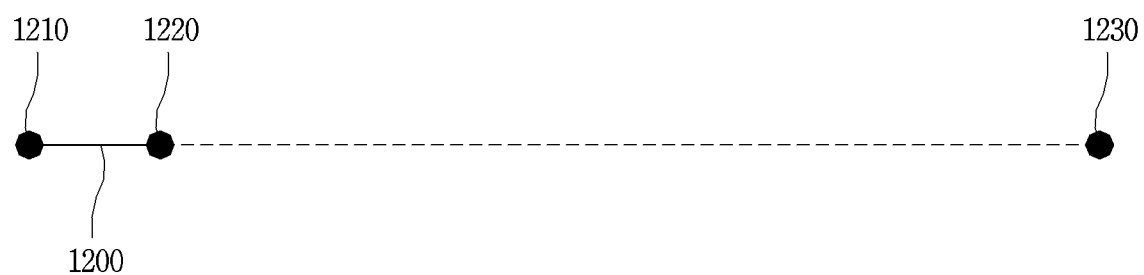
FIGS. 12A, 12B, 12C, and 12D are schematic views illustrating an example of extension of a timeline.

As illustrated in FIG. 12A, the timeline 1200 may be represented by a solid line, and a dotted line may be drawn between the another end 1220 of the timeline 1200 and the end time point indicating object 1230. Other various ways may be used in addition to the solid and dotted lines. For example, the timeline 1200 may be represented by a solid line of a first color, and a solid line of a second color may be drawn between the another end 1220 of the timeline 1200 and the end time point indicating object 1230.

Figure 12B:

The processor 870 may control the display 850 such that the timeline 1200 extends in one direction as the vehicle 100 travels. As illustrated in FIGS. 12A and 12B, the timeline 1200 may extend from one end of the timeline 1200 in a direction toward the end time point indicating object 1230 as the vehicle 100 travels.

An extent or degree to which the timeline 1200 extends varies according to a driving speed of the vehicle 100. This is to indicate that the remaining time to the destination decreases.

Figure 12C:
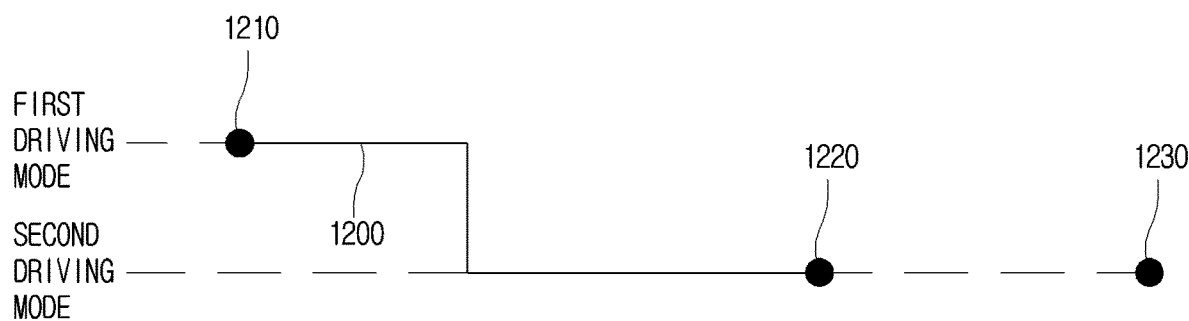
Figure 12D:
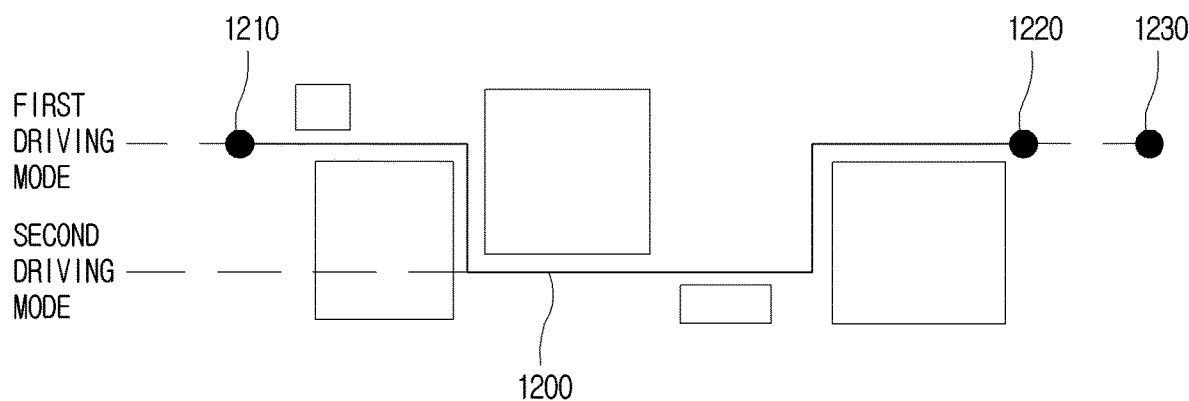

When the driving mode of the vehicle 100 is switched, another end 1220 of the timeline 1200 may move in a different direction perpendicular to the one direction in response to a switched driving mode of the vehicle 100. As illustrated in FIGS. 12C and 12D, when the driving mode of the vehicle 100 is switched from a first driving mode to a second driving mode, the another end 1220 of the timeline 1200 may move to a lower part (downward) of the display 850. As illustrated in FIG. 12D, when the driving mode of the vehicle 100 is switched from the second driving mode to the first driving mode, the another end 1220 of the timeline 1200 may move to an upper part (upward) of the display 850.

A graphic object indicating an event included in a first group is displayed on a first area located above the timeline 1200, and an event included in a second group is displayed on a second area located below the timeline 1200. A height of each graphic object is also changed according to a height of the timeline.

The present disclosure can be implemented as computer-readable codes (applications or software) in a program-recorded medium. The method of controlling the autonomous vehicle can be realized by a code stored in a memory or the like.

The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described implementations are not limited by any of the details of the foregoing description, unless otherwise specified, but rather should be construed broadly within its scope as defined in the appended claims. Therefore, all changes and modifications that fall within the metes and bounds of the claims, or equivalents of such metes and bounds are therefore intended to be embraced by the appended claims.

The invention claimed is:

1. An image output device mounted on a vehicle, the device comprising:
   a display; and
   a processor configured to control the display to output a timeline for displaying events occurring while the vehicle is traveling,
   wherein the display is divided into a first area and a second area with respect to the timeline,
   wherein the processor classifies the events into a first group and a second group according to a predetermined reference, and controls the display such that a first graphic object indicating an event included in the first group is displayed on the first area and a second graphic object indicating an event included in the second group is displayed on the second area, wherein when a driving mode of the vehicle is changed from a first driving mode to a second driving mode, the processor controls the display such that the timeline is changed to bend to identify the second driving mode, when the driving mode of the vehicle is changed from the second driving mode to the first driving mode, the processor controls the display such that the timeline is changed to bend to identify the first driving mode, and wherein the processor controls the display to display the first graphic object indicating an event related to driving of the vehicle in the first area located at a top of the timeline, and controls the display to display the second graphic object indicating an event irrelevant to the driving of the vehicle in the second area located at a bottom of the timeline.

2. The device of claim 1, wherein the processor controls the display such that a position of at least a part of the timeline is changed according to the driving mode of the vehicle.

3. The device of claim 2, wherein the processor, when the position of the part of the timeline is changed, controls the display such that a size of at least one of the first graphic object and the second graphic object is changed.

4. The device of claim 3, wherein the position of the part of the timeline is changed to enlarge the second area when the vehicle is in an autonomous driving mode, and wherein a size of a graphic object indicating an event included in the second group is increased as the second area is enlarged.

5. The device of claim 3, wherein the position of the part of the timeline is changed to enlarge the first area when the vehicle is in a manual driving mode, and wherein a size of a graphic object indicating an event included in the first group is increased as the first area is enlarged.

6. The device of claim 1, wherein one end of the timeline indicates a time point when the vehicle was turned on, and another end of the timeline indicates a current time point, wherein the processor controls the display such that the timeline extends in one direction as the vehicle travels, and wherein an extent to which the timeline extends varies according to a driving speed of the vehicle.

7. The device of claim 1, further comprising a communicator configured to receive a terminal event occurred in a mobile terminal located in the vehicle, wherein the processor controls the display such that a graphic object indicating the terminal event is displayed on the first area.

8. The device of claim 7, wherein the communicator receives an electrical component event from an electrical component provided in the vehicle and generating vehicle driving information, wherein the processor controls the display such that a graphic object indicating the electrical component event is displayed on the second area.

9. A method for controlling an image output device, the method comprising:

controlling a display to output a timeline for displaying events occurring while a vehicle is traveling, the display being divided into a first area and a second area with respect to the timeline;

classifying the events into a first group and a second group according to a predetermined reference;

controlling the display such that a first graphic object indicating an event included in the first group is displayed on the first area, and a second graphic object indicating an event included in the second group is displayed on the second area;

when a driving mode of the vehicle is changed from a first driving mode to a second driving mode, controlling the display such that the timeline is changed to bend to identify the second driving mode;

when the driving mode of the vehicle is changed from the second driving mode to the first driving mode, controlling the display such that the timeline is changed to bend to identify the first driving mode; and controlling the display to display the first graphic object indicating an event related to driving of the vehicle in the first area located at a top of the timeline, and controlling the display to display the second graphic object indicating an event irrelevant to the driving of the vehicle in the second area located at a bottom of the timeline.

10. The method of claim 9, further comprising controlling the display such that a position of at least a part of the timeline is changed according to the driving mode of the vehicle.

11. The method of claim 10, further comprising controlling the display such that a size of at least one of the first graphic object and the second graphic object is changed when the position of the part of the timeline is changed.

12. The method of claim 11, wherein the position of the part of the timeline is changed to enlarge the second area when the vehicle is in an autonomous driving mode, and wherein a size of a graphic object indicating an event included in the second group is increased as the second area is enlarged.

13. The method of claim 11, wherein the position of the part of the timeline is changed to enlarge the first area when the vehicle is in a manual driving mode, and wherein a size of a graphic object indicating an event included in the first group is increased as the first area is enlarged.

14. The method of claim 9, further comprising controlling the display such that the timeline extends in one direction as the vehicle travels, wherein an extent to which the timeline extends varies according to a driving speed of the vehicle, and one end of the timeline indicates a time point when the vehicle was turned on, and another end of the timeline indicates a current time point.

15. The method of claim 9, further comprising:

receiving a terminal event occurred in a mobile terminal located in the vehicle through a communicator; and controlling the display such that a graphic object indicating the terminal event is displayed on the first area.

16. The method of claim 15, further comprising:

receiving an electrical component event from an electrical component provided in the vehicle and generating vehicle driving information through the communicator; and controlling the display such that a graphic object indicating the electrical component event is displayed on the second area.

* * * * *